May 2, 1939.  H. F. SUVERKRUP  2,156,438
MEANS TO LOAD VEHICLES
Filed April 27, 1937    3 Sheets-Sheet 1
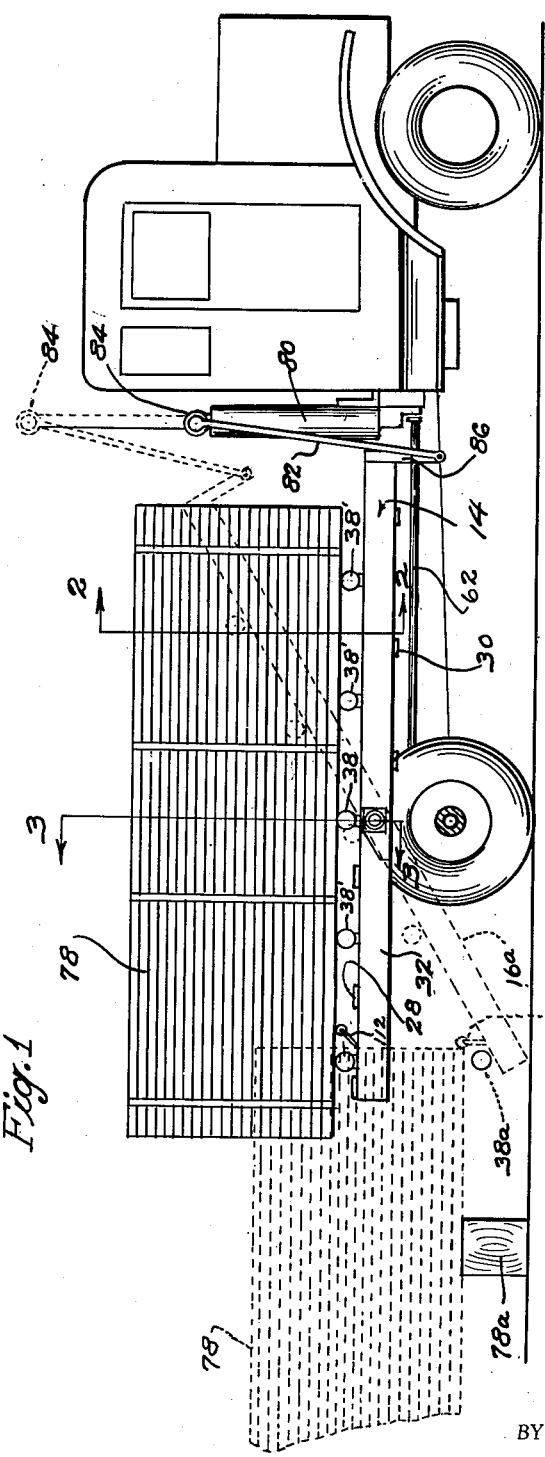
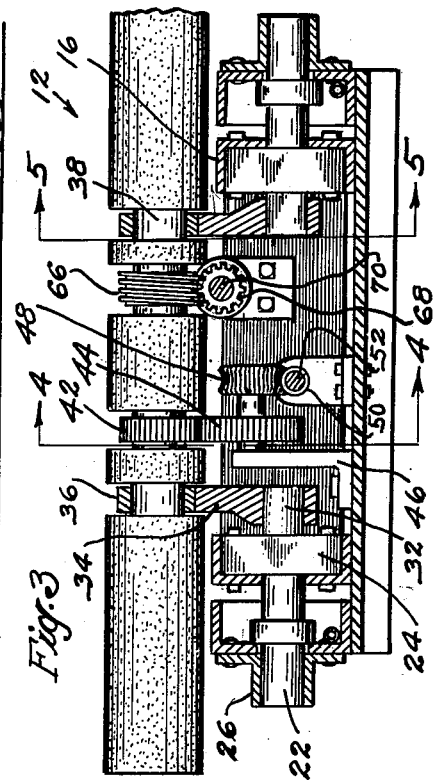
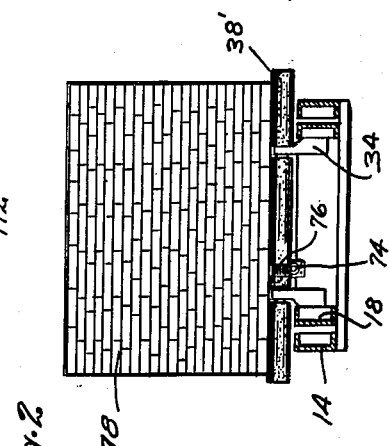
INVENTOR.
Herbert F. Suverkrup
BY Robt F. Woolsey
ATTORNEY.

May 2, 1939.   H. F. SUVERKRUP   2,156,438
MEANS TO LOAD VEHICLES
Filed April 27, 1937     3 Sheets-Sheet 2
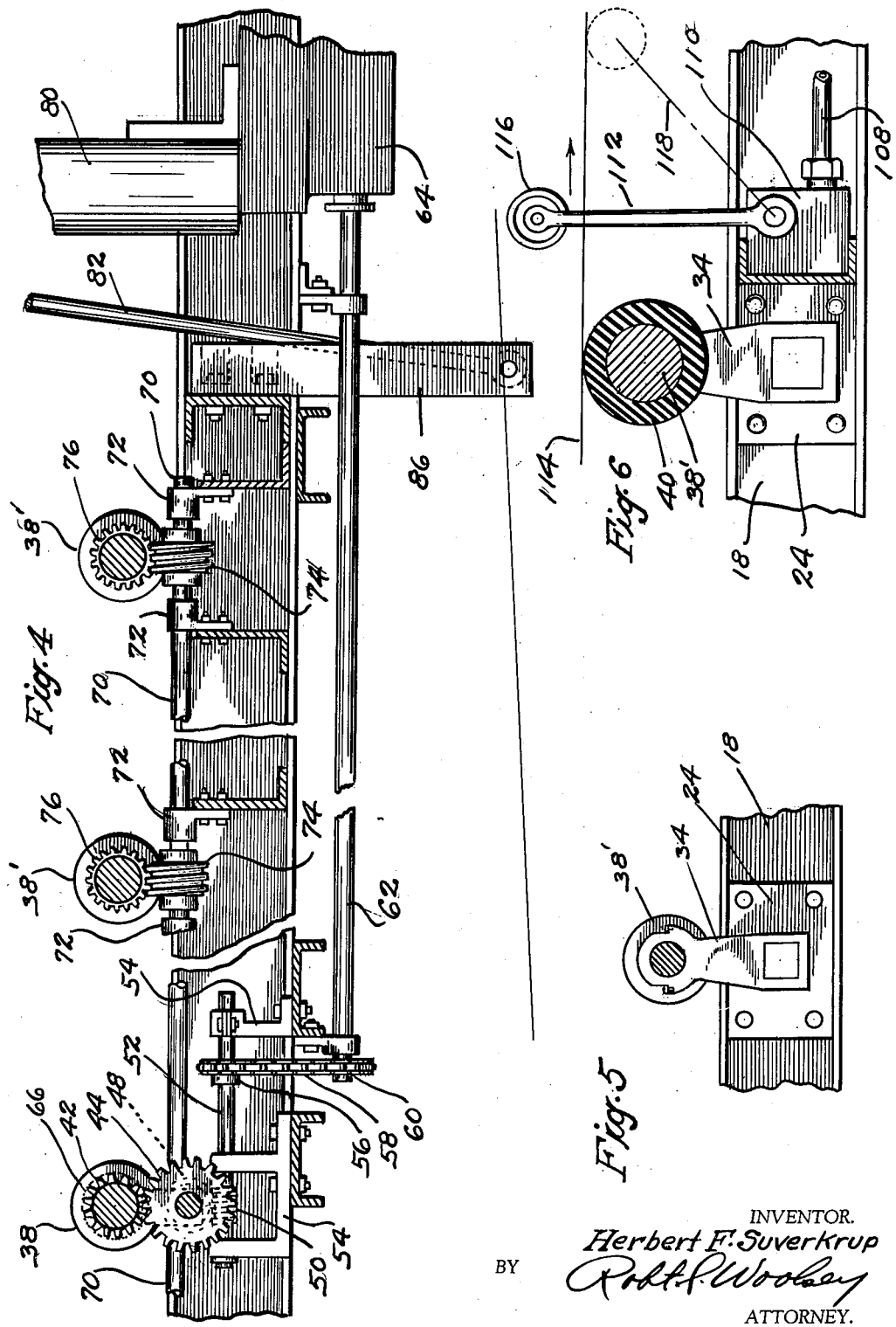
INVENTOR.
Herbert F. Suverkrup
BY
ATTORNEY.

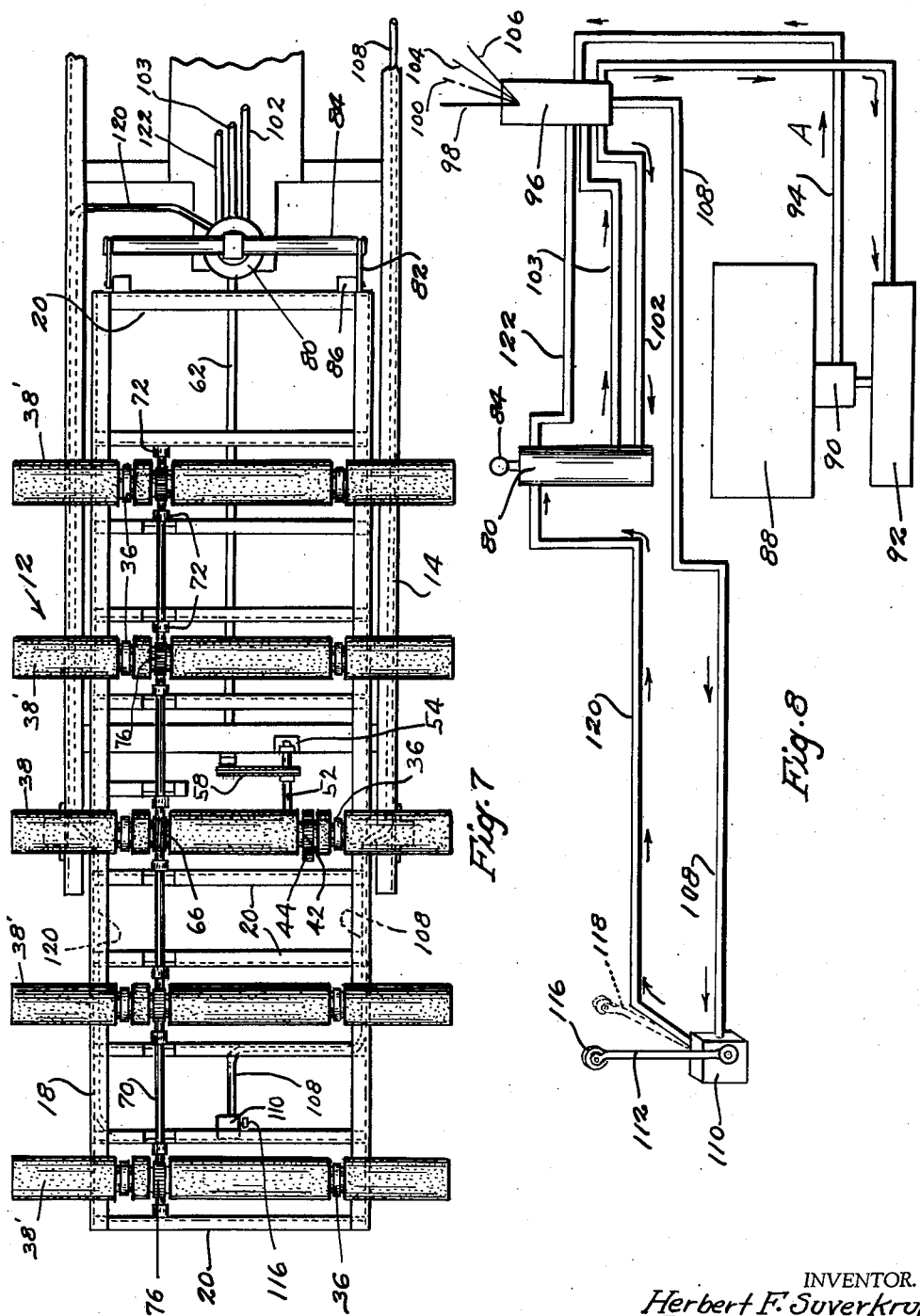

Patented May 2, 1939

2,156,438

UNITED STATES PATENT OFFICE 2,156,438

MEANS TO LOAD VEHICLES

Herbert F. Suverkrup, San Bernardino, Calif.

Application April 27, 1937, Serial No. 139,168

2 Claims. (Cl. 214—84)

The device of this invention, as the title indicates, refers to means to load, and conversely to unload vehicles, particular reference being had to developing means to load and unload lumber in those yards in which for economic reasons, it is impractical to employ traveling cranes, etc., to accomplish the prime purpose of this invention.

In many lumber yards which employ a delivery-man and a yard-man, it is usual practice that both men load the delivery vehicle, however, when delivery is being made, the yard-man ordinarily has little to do until the delivery vehicle returns. For the sake of economy it is desirable that the yard-man put his time in as efficiently as possible, and that a system be developed for moving lumber which will permit the yard-man to stack and prepare the next subsequent load for delivery during the interval that delivery is being made with previous batch of lumber.

With the foregoing premise in mind, it is necessary to take the following steps to accomplish the broader object of this invention;

First, that the lumber to be next delivered, be packaged and that it be laid across supports whereby it may be removed from the ground or floor, and secondly that means be applied to lift the lumber off of its rest or support and to place the same on a delivery vehicle without the aid of human effort.

It is therefore a prime object of the present invention to provide facilities to enable a delivery vehicle or truck to be, practically speaking, in continuous delivery service.

A further object of the invention is to provide mechanical means built in the truck to enable the driver thereof to load or unload the same substantially without human effort.

Advantages of the invention reside in increased efficiency of employee and equipment used; the elimination of lost lumber by reason of the fact that the merchandise is packaged or bound with metal straps; the delivery of merchandise which is not crushed or broken during the interval of either loading or unloading.

Other objects, and advantages of the invention may appear from the accompanying drawings, the specification, and the subjoined claims.

In the drawings of which there are three sheets:

Figure 1 is a utility view showing a truck in loaded condition and equipped with the loading device of this invention, dotted lines showing the position of lumber to be loaded and the position of the swingable chassis frame prior to picking up the new load.

Figure 2 is a sectional view taken on line 2—2, Figure 1, showing general arrangement of the load with respect to the loading means of this invention.

Figure 3 is a fragmental sectional elevation taken on line 3—3, Figure 1, showing construction and application of the power means to load or unload the vehicle as schematically shown in Figure 1.

Figure 4 is a sectional elevation taken on line 4—4 of Figure 3 showing application of power from the transmission case of the truck to the loading means of this invention.

Figure 5 is a detail showing one means of supporting the rollers upon which the load is carried.

Figure 6 is a detail showing one form of application of the actuating valve to control the pressure fluid to operate the hydraulic lift employed in the device of this invention.

Figure 7 is a plan view showing the general arrangement of the operating elements of this invention.

Figure 8 is a schematic arrangement showing the pressure fluid system employed to actuate the hydraulic lift of the present invention.

The essence of the present invention resides in having bundles of freight (lumber) spaced from the ground or floor, as upon timbers, and then providing means built in a truck to, first, pick up the bundle at its one end and to lift it to the angle at which its trucking cradle reposes, and then to cause the bundle to advance upon or move forwardly upon the cradle concurrently with moving the truck rearwardly under the bundle.

To effect the above action, various known elements are brought into new combination and applied in such a manner as to be new, insofar as applicant has knowledge, to effect an efficient and novel loading means.

By reference to the drawings, it will be noted that the device of this invention 12, which is built upon a truck chassis 14, includes a cradle 16 built of structural steel channel members having side members 18 and a good and sufficient number of cross-pieces 20 as may be necessary to form a strong and rigid cradle, which as shown, particularly in Figure 3, is pivotally connected to the chassis 14 by means of trunnions 22 supported upon suitable brackets 24 secured in the side members 18, and journalled in bearings 26 which are secured to the side members of the chassis frame, thereby enabling the cradle 16 to swing through such an angle of inclination as may be necessary to fulfill the functional requirements of the invention. It may be here pointed out, that the cross members of the truck chassis are so positioned rearwardly of the trunnions 22 as not to interfere with freely swinging the cradle 16 through its necessary freeway, likewise, at all points forwardly of the trunnions 22, the chassis must be free of interfering cross members, this structural requirement may be met by arranging cross members 28 upon the top surface of the chassis frame and by placing cross members 30 upon the lower surface of the longitudinal members 32 of the chassis 14.

Upon the inner side of the brackets 24, I provide bosses 32 which are adapted to receive stanchions 34 upon which are mounted bearings 36, in which I journal rollers 38 which are adapted to directly support the vehicle load.

The rollers 38 are covered with a sufficient thickness of rubber 40 to provide traction for loading, and as shown in Figures 3 and 7, I remove a portion of the rubber 40 to provide access to the steel core of the roller 38, not only to enable the same to be journalled in bearings 38, but also for the purpose of securing certain gears in position for the purpose of rotating the rollers 38. In Figure 3, I show one mode of effecting roller rotation, wherein 42 is a spur type of gear in mesh with a second spur gear 44 mounted upon a bracket 46 which is secured to one of the cross-pieces 30 of the chassis frame. A gear 48 is fixed upon the inner end of the shaft which carries gear 44, and which is in mesh with a gear 50 mounted upon a stub shaft 52 which is journalled in bearings 54. Power means such as gears 56, chain 58, gear 60, and a drive shaft 62, connected with a conventional transmission case 64, provides power to drive the aforementioned-gearing. The rubber covering 40 is bared from each of the rollers 38 to permit fitting a gear 66 thereupon, which gear is in mesh with gear 68 which is secured upon a longitudinally extending shaft 70. The shaft 70 is suitably supported in bearings 72 at all points along its length to provide sufficient rigidity for operating purposes. Gears 74 are mounted upon the shaft 70, and are adapted to drive gears 76, of which there is one upon each of the rollers 38.

The aforementioned assembly of gears and accessories provides the necessary drive to effect rotation of the rollers 36 to either load or unload the freight 78.

In order to tilt the cradle 16, it is necessary to provide a suitable power lift, this I accomplish by employing a conventional hydraulic lift 80 which is suitably mounted upon the truck chassis 14 and which is supplied with fluid under pressure in the well known manner, which fluid is controlled in a manner to be hereinafter described.

The lift 80 may be secured to the cradle in any suitable manner, one mode of application being the interposition of links 82 between the cross-head 84 and downwardly extending arms 86, the links 82 being swivelly connected to both the arms 86 and the cross-head 84 to accommodate the variable angular position through which the cradle 16 must move in being lifted and lowered.

As previously mentioned pressure fluid may be supplied in the well known manner, however it is necessary that its movement be controlled in a particular manner for proper functioning of the device of this invention, and in order to illustrate the same, reference will be made to Figure 8, wherein the hydraulic lift and its appurtenances are schematically illustrated, and in which 88 indicates the power unit or engine of the truck, which through conventional connection is adapted to operate a pump 90 receiving its fluid from a sump 92. After starting the pump 90 (through a clutch not shown) fluid is drawn from the sump and is forced through pipe 94 in the direction of the arrows "A" to a master valve 96 which may be conveniently located upon the dash-board of the truck. The valve lever 98 is shown as being in neutral position, but which when moved forwardly to position 100 permits fluid to flow through pipe 102 to lift the elevator 80. By moving the lever to position 104 pressure fluid is cut off and an exhaust port is opened to permit exhaust of fluid within the lift through pipe 103 and subsequent lowering of the lift.

By moving the valve lever 98 to position 106 fluid is cut off from the lower end of the lift 80 and is permitted to flow through pipe 108 to an automatically operated valve 110 which is positioned in one of the cross-members 20 of the cradle 16 as shown in Figures 1, 6 and 7, in such a manner that the control arm 112 projects above a horizontal plane 114 which is tangential to the topmost point of the rollers 38 and which plane represents the lower side of the freight 78 when in position to be hauled upon the truck chassis 12. The valve arm 112 is provided with an anti-friction roller 116 to prevent interference with the valve 110 during the interval that the freight is being unloaded.

When the valve is moved forwardly to the dotted line position 118, pressure fluid is permitted to pass through the valve and to enter pipe 120 from which it enters the top end of the lift 80 to force the same downwardly to return the cradle to normal position. Movement of the master valve control arm 98 to fluid admission position, automatically operates to exhaust, or to permit the exhausting of fluid that may have remained upon the opposite side of the piston (not shown) in the hydraulic lift. Thus moving valve lever 98 to position 106 automatically opens a port in the valve to permit exhaust of fluid through pipe 103, likewise moving the lever to position 104 operates to permit fluid to be exhausted from the top side of the lift through pipe 122.

To place the loading device of this invention in operation, it is only necessary that the transporting vehicle be placed in the general position indicated in Figure 1 with respect to the freight to be moved, and that the operator then engage the pump 90 with the engine 88 in order to pump fluid from the sump 92 to the valve 96 through pipe 94, thus when valve lever 98 is moved to position 104, fluid flows therefrom and through pipe 102 to the elevator which lifts the cradle to dotted line position. The truck is then backed, until the end roller 38a has passed under the forward end of the lumber shown in dotted lines as lying across the timbers 78a. Further backward motion of the truck will cause the lumber to move the valve lever 112 to the position shown in dotted lines at 118 thereby opening valve 110 and permitting fluid to flow to the lift 80 through pipe 120. This action when taken together with further backing of the truck, and concurrent rotation of the rollers 38 in a clock-wise direction as will now be described, causes the load to move forwardly upon the rollers to the position shown in full lines in Figure 1.

As soon as the operator has backed the truck a sufficient distance to enable the cradle to be placed well under the load, then he throws the drive shaft 62 in gear by a hand operation, which while not shown is similar to driving the vehicle through transmission gear shifting, which operation drives gear 60, chain 58, gear 56, stub shaft 52, gear 48, and gears 44 and 42, thus rotating roller 38, which through gears 66 and 68, drive shaft 70, and gears 74 and 76 causes the rollers 38' to rotate in the same direction as roller 38.

To unload the lumber, it is only necessary to reverse the previously described operation, which of course, first, lifts the load to an angular position as shown at 16a, and secondly, to place the rollers 38 and 38' in counter-clockwise rotation, thus causing the load to back off of the cradle 16 and to be deposited upon the ground with the least inconvenience and a minimum of damage to the lumber delivered.

It is obvious that various changes and modifications and variations may be made in practicing the invention in departure from the particular showing of the drawings and description as given, without, however, departing from the true spirit of the invention as defined by the scope of the appended claims.

I claim:

1. A motor vehicle to carry freight, said vehicle including a chassis, a power source, a cradle pivotally mounted in said chassis, a plurality of rollers mounted upon said cradle, one of said rollers being power driven by said power source, the others of said rollers being in train with said power driven roller, means to oscillate said cradle, said oscillating means being a hydraulic lift, and valves to control application of fluid pressure to said lift, certain of said valves being manually operated and certain others of said valves being adapted to be actuated by the freight to be carried on said vehicle.

2. In combination with a motor vehicle, means to load said vehicle, said means comprising a cradle pivotally mounted on said vehicle and adapted to have an end thereof placed under an end of a load spaced from its base support, rollers on said cradle, one of said rollers being power driven, the others of said rolers being in train with said power driven roller, means to tilt said cradle, said oscillating means being a hydraulic lift, and valves to control application of fluid pressure to said lift, certain of said valves being manually operated and certain others of said valves being adapted to be actuated by the said load to be carried on said vehicle.

HERBERT F. SUVERKRUP.